(12) United States Patent
Ha et al.

(10) Patent No.: US 11,460,904 B2
(45) Date of Patent: Oct. 4, 2022

(54) IMAGE DISPLAYING APPARATUS AND METHOD OF OPERATING THE SAME

(71) Applicant: LG ELECTRONICS INC., Seoul (KR)

(72) Inventors: Junwoo Ha, Seoul (KR); Jaeung Han, Seoul (KR); Daewoong Lim, Seoul (KR); Junghoon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/112,189

(22) Filed: Dec. 4, 2020

(65) Prior Publication Data

US 2021/0200295 A1 Jul. 1, 2021

(30) Foreign Application Priority Data

Dec. 26, 2019 (KR) .................. 10-2019-0175180

(51) Int. Cl.
*G06F 21/32* (2013.01)
*G06F 1/3231* (2019.01)
(Continued)

(52) U.S. Cl.
CPC .......... *G06F 1/3231* (2013.01); *G06F 1/3265* (2013.01); *G06F 21/32* (2013.01);
(Continued)

(58) Field of Classification Search
CPC .... G06F 1/3231; G06F 1/3234; G06F 1/3265; G06F 21/32; G06F 21/84;
(Continued)

(56) References Cited

U.S. PATENT DOCUMENTS

2005/0289363 A1* 12/2005 Tsirkel ............... G06F 1/3203
713/300
2014/0132508 A1* 5/2014 Hodge ................ G06F 1/3265
345/156
(Continued)

FOREIGN PATENT DOCUMENTS

KR 1019990009936 2/1999
KR 1020040047360 6/2004
(Continued)

OTHER PUBLICATIONS

Korean Intellectual Property Office Application No. 10-2019-0175180, Office Action dated Jan. 6, 2021, 5 pages.

*Primary Examiner* — Dennis P Joseph
(74) *Attorney, Agent, or Firm* — Lee, Hong, Degerman, Kang & Waimey PC (57) ABSTRACT

The present disclosure relates to an image displaying apparatus. The image displaying apparatus according to an embodiment of the present disclosure includes: an input unit, a camera, a display, and a controller configured to: when the display is turned on and a screen is displayed, check whether a user input is received through the input unit; in response to the user input not being received within a predetermined first period of time, acquire a first image through the camera; determine whether at least one object, corresponding to a face of a user, is included in the acquired first image; and when the at least one object, corresponding to the face of the user, is not included in the acquired first image, control the display to be turned off. Various other embodiments are possible.

8 Claims, 8 Drawing Sheets

(51) Int. Cl.
  *G06F 1/3234* (2019.01)
  *G09G 3/20* (2006.01)
  *G06F 21/84* (2013.01)
  *G06V 40/16* (2022.01)

(52) U.S. Cl.
  CPC ............ *G06F 21/84* (2013.01); *G06V 40/172* (2022.01); *G09G 3/20* (2013.01); *G09G 2330/022* (2013.01); *G09G 2354/00* (2013.01); *G09G 2360/141* (2013.01); *G09G 2360/144* (2013.01)

(58) Field of Classification Search
  CPC .............. G06F 2330/022; G06F 3/013; G09G 2330/02; G09G 2330/021
  See application file for complete search history.

(56) References Cited

U.S. PATENT DOCUMENTS

2019/0303551 A1* 10/2019 Tussy ..................... G06F 21/34
2020/0128174 A1*  4/2020 Lin .................... H04N 5/23219
2020/0293753 A1*  9/2020 Sehgal ................... G06F 21/32
2020/0293754 A1*  9/2020 Huang ................. G06F 3/0346

FOREIGN PATENT DOCUMENTS

| KR | 1020070116714 | 12/2007 |
| KR | 1020130127777 | 11/2013 |
| KR | 1020160014915 |  2/2016 |

\* cited by examiner

IMAGE DISPLAYING APPARATUS AND METHOD OF OPERATING THE SAME

CROSS-REFERENCE TO RELATED APPLICATION

Pursuant to 35 U.S.C. § 119(a), this application claims the benefit of earlier filing date and right of priority to Korean Patent Application No. 10-2019-0175180, filed on Dec. 26, 2019, the contents of which are hereby incorporated by reference herein its entirety.

BACKGROUND OF THE INVENTION

1. Field of the Disclosure

The present disclosure relates to an image displaying apparatus and a method of operating the same.

2. Description of the Related Art

An image displaying apparatus is an apparatus for providing images to be viewed by a user. For example, the image displaying apparatus may be various electronic devices, such as a display for displaying images.

There have been various methods to reduce unnecessary power consumption of electronic devices. Considering that most of the power consumption of the electronic device is due to displaying of a screen on the display, a conventional method includes turning off the screen by automatically turning off the display of the electronic device when a user does not use the electronic device for a predetermined period of time.

In the conventional method, it is determined whether the electronic device is used by a user or not based on whether a user input is received through an input device within a predetermined period of time, and if it is determined that the electronic device is not in use, the display is turned off. However, such method is inconvenient in that even when a user simply stares at the screen, the display is also turned off after a lapse of a predetermined period of time, requiring the user to unnecessarily operate the input device to turn on the display again.

SUMMARY OF THE INVENTION

It is an object of the present disclosure to solve the above and other problems.

It is another object of the present disclosure to provide an image displaying apparatus and a method of operating the same, in which the image displaying apparatus may control the on/off of a display by identifying a user's environment based on images acquired by a camera.

In accordance with an aspect of the present disclosure, the above and other objects can be accomplished by providing an image displaying apparatus, including: an input unit; a camera; a display; and a controller, wherein the controller: when the display is turned on and a screen is displayed, checks whether a user input is received through the input unit; in response to the user input not being received within a predetermined first period of time, acquires a first image through the camera; determines whether at least one object, corresponding to a face of a user, is included in the acquired first image; and in response to the at least one object, corresponding to the face of the user, not being included in the acquired first image, controls the display to be turned off In accordance with another aspect of the present disclosure, the above and other objects can be accomplished by providing a method of operating an image displaying apparatus, the method including: when a display, included in the image displaying apparatus, is turned on and a screen is displayed, checking whether a user input is received; in response to the user input not being received within a predetermined first period of time, acquiring a first image through a camera; determining whether at least one object, corresponding to a face of a user, is included in the acquired first image; and in response to the at least one object, corresponding to the face of the user, not being included in the acquired first image, controlling the display to be turned off.

DETAILED DESCRIPTION OF THE PREFERRED EMBODIMENTS

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components.

Terms "module" and "part" for elements used in the following description are given simply in view of the ease of the description, and do not carry any important meaning or role. Therefore, the "module" and "part" may be used interchangeably.

It should be understood that the terms "comprise", "include", "have", etc. when used in this specification, specify the presence of stated features, integers, steps, operations, elements, components, or combinations of them but do not preclude the presence or addition of one or more other features, integers, steps, operations, elements, components, or combinations thereof.

It will be understood that, although the terms "first", "second", etc. may be used herein to describe various elements, these elements should not be limited by these terms. These terms are only used to distinguish one element from another element.

Unless otherwise defined, all terms including technical and scientific terms used herein have the same meaning as commonly understood by one of ordinary skill in the art to which the present disclosure belongs. Further, terms defined in a common dictionary will not be interpreted in an idealized or overly formal sense unless expressly so defined herein.

In the drawings, the thicknesses or the sizes of elements and graphs may be exaggerated, omitted or simplified to more clearly and conveniently illustrate the present disclosure.

Figure 1A:
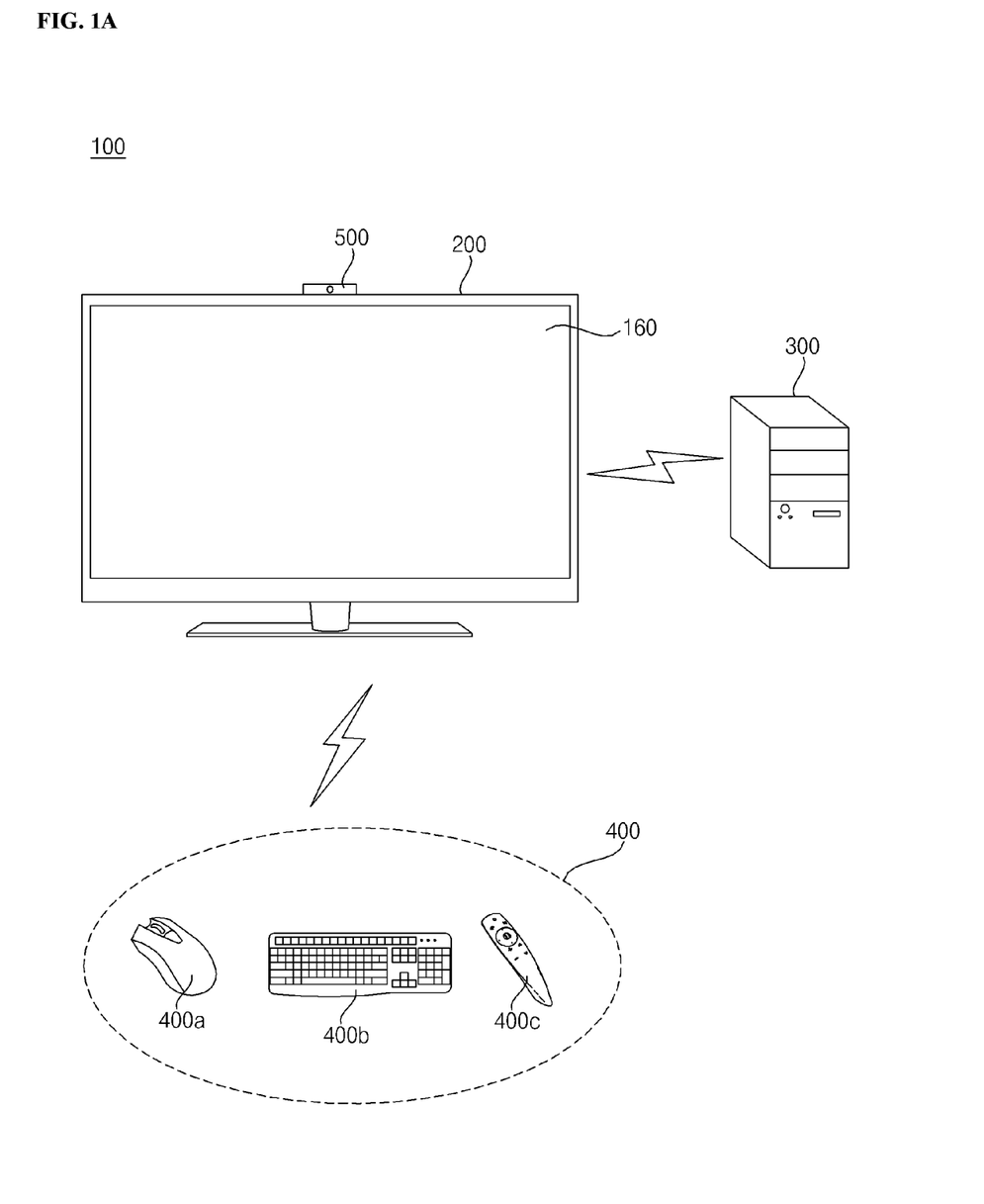
FIGS. 1A and 1B are diagrams illustrating an image displaying apparatus according to various embodiments of the present disclosure.
Figure 1B:
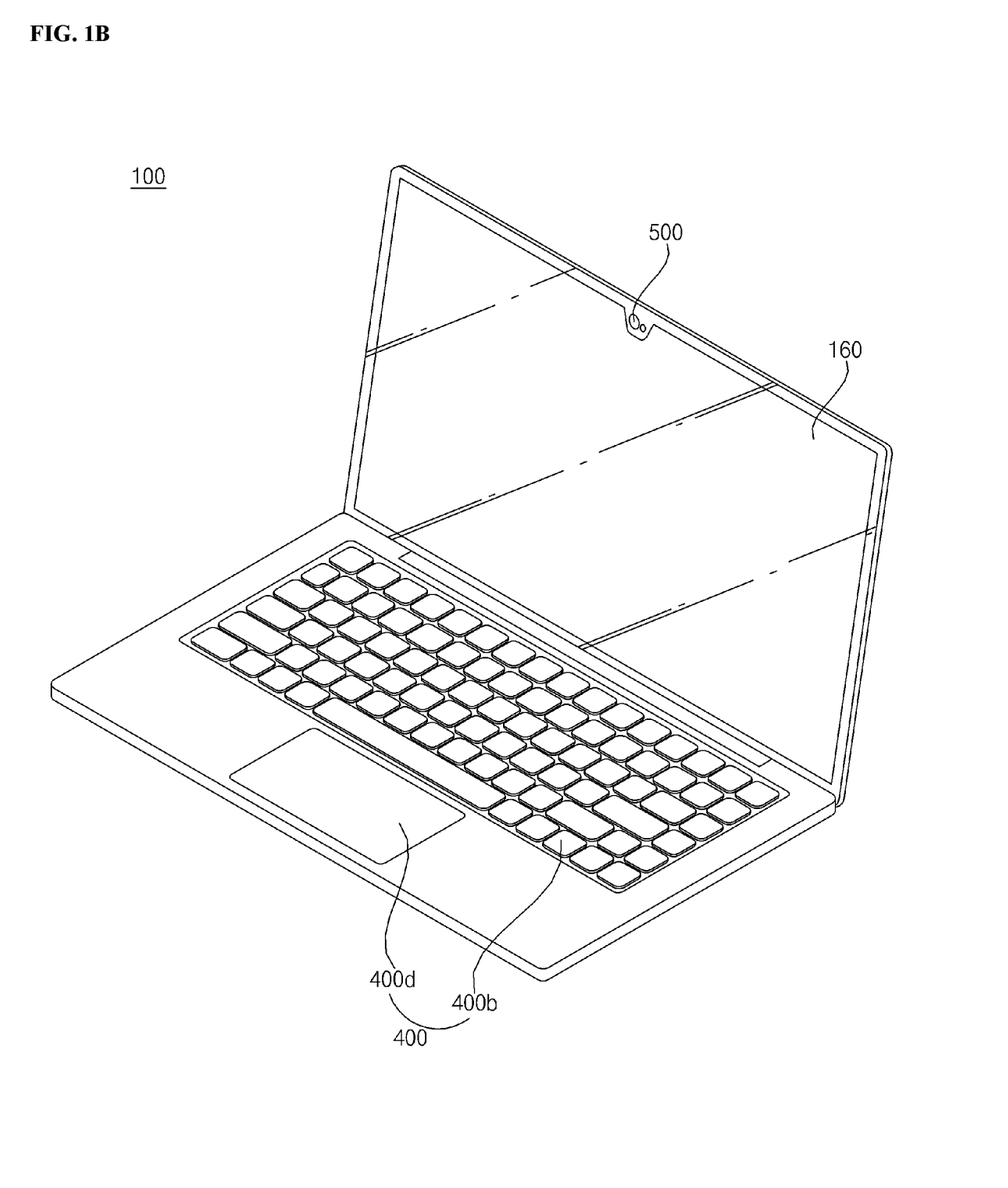

FIGS. 1A and 1B are diagrams illustrating an image displaying apparatus according to various embodiments of the present disclosure.

The image displaying apparatus 100 may be an apparatus for processing and outputting images. Examples of the image displaying apparatus 100 may include a television (TV), a laptop computer, a smartphone, a tablet PC, etc., but the image displaying apparatus 100 is not particularly limited thereto as long as the apparatus may output a screen on which images are displayed.

The image displaying apparatus 100 may receive a broadcast signal and process the received broadcast signal, and may output a signal-processed broadcast image. In the case where the image displaying apparatus 100 receives the broadcast signal, the image displaying apparatus 100 may serve as a broadcast receiving device. In this case, the image displaying apparatus 100 may receive the broadcast signal wirelessly through an antenna or by wire through cables. For example, the image displaying apparatus 100 may receive a terrestrial broadcast signal, a satellite broadcast signal, a cable broadcast signal, an Internet Protocol TV (IPTV) broadcast signal, and the like.

Referring to FIG. 1A, the image displaying apparatus 100 includes a display device 200, a processing device 300, and/or a remote controller 400. The image displaying apparatus 100 may further include a camera 500 for acquiring images.

The display device 200 includes a display 160 and may output an image based on an image signal received from the processing device 300. For example, the display device 200 may store images received from the processing device 300, and may output the stored images according to a screen size of the display device 200, a number of frames displayed per second, and the like.

The display device 200 may be a TV, a monitor, a project, etc., but is not particularly limited thereto as long as the device may output an image corresponding to an image signal.

The processing device 300 may be a computer, but is not limited thereto as long as the device may transmit a signal including RGB data to the display device 200.

The remote controller 400 may be connected wirelessly or by wire with the display device 100 and/or the processing device 300 to provide various control signals. In this case, the remote controller 400 may include a device for establishing a wired/wireless network with the display device 100 and/or the processing device 300, and transmitting various control signals or receiving signals related to various operations through the established network.

For example, the remote controller 400 may be various input devices such as a mouse 400a, a keyboard 400, a pointing device 400c, a trackball, a joystick, and the like. The remote controller 400 may be referred to as an external device, an input device, an input unit, etc., which will be used interchangeably as needed hereinafter.

Referring to FIG. 1B, the image displaying apparatus 100 may be an electronic device including a display 160, a processing device 300 (e.g., the processing device 300 of FIG. 1A), an input device 400, and/or a camera 500.

For example, the image displaying apparatus 100 may be a laptop computer including all the display 160, a keyboard 400b, a touch pad 400d, and the camera 500.

Figure 2:
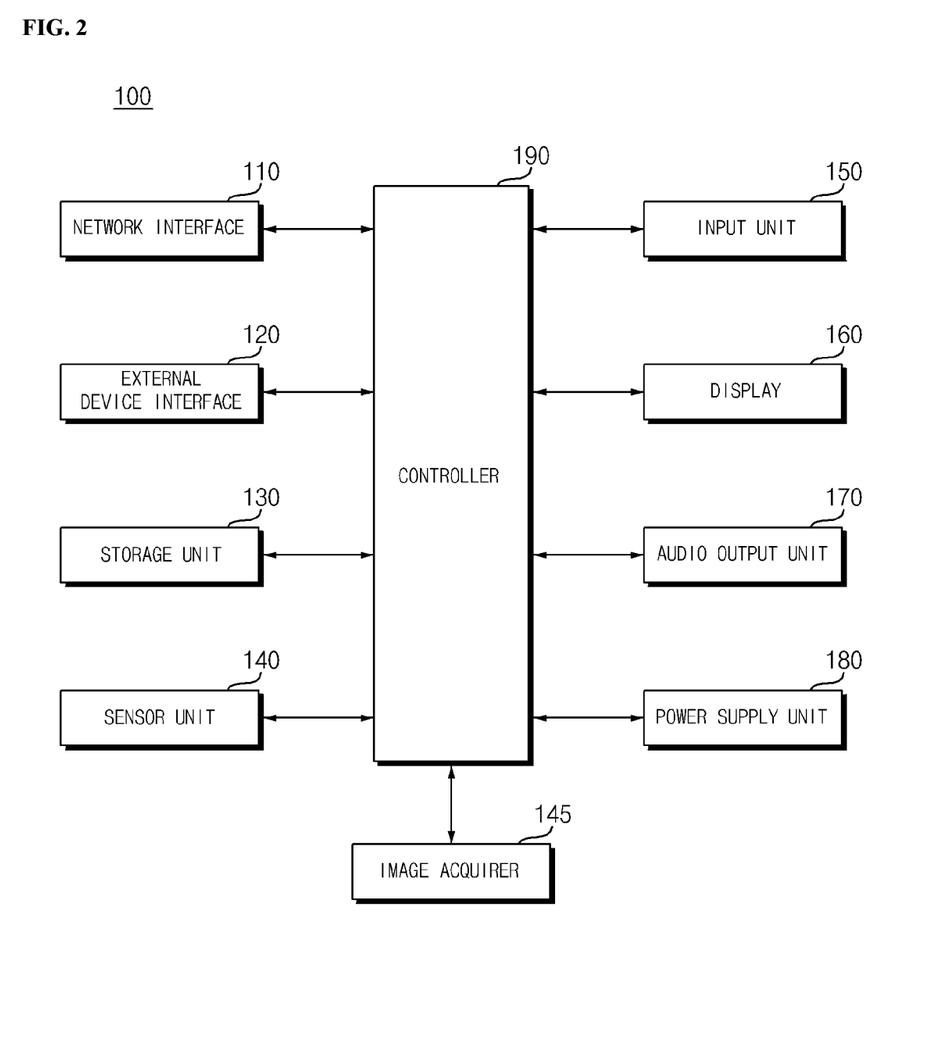
FIG. 2 is an internal block diagram illustrating the image displaying apparatus of FIG. 1.

FIG. 2 is an internal block diagram illustrating the image displaying apparatus of FIG. 1.

Referring to FIG. 2, the image displaying apparatus 100 includes a network interface 110, an external device interface 120, a storage unit 130, a sensor unit 140, an image acquirer 145, an input unit 150, a display 160, an audio output unit 170, a power supply unit 180, and/or a controller 190.

The network interface 110 may provide an interface for connecting the image displaying apparatus 100 to a wired/wireless network including the Internet network. For example, the network interface 110 may receive contents or data provided by an Internet service provider, a contents provider, or a network operator.

In addition, the network interface 110 may include a communication module (not shown) for connection with a wired/wireless network.

The external device interface 120 may transmit and receive data with a connected external device. To this end, the external device interface 120 may include an A/V input/output (I/O) unit (not shown).

The external device interface 120 may be connected by wire/wirelessly to an external device, such as a Digital Versatile Disk (DVD), Blu-Ray, game console, camera, smartphone, etc., and may perform input/output operations with the external device.

Further, the external device interface 120 may establish a communication network with various remote controllers 200 as illustrated in FIGS. 1A and 1B, to receive control signals, related to the operation of the image displaying apparatus 100, from the remote controllers 200, or to transmit data, related to the operation of the image displaying apparatus 100, to the remote controllers 200.

The A/V input/output (I/O) unit may receive input of image and audio signals of the external device.

The external device interface 120 may include a wireless communicator (not shown) for near field communication with other electronic devices. The external device interface 120 may exchange data in near field communication with an adjacent mobile terminal through the wireless communicator (not shown).

The storage unit 130 may store programs for processing and controlling signals of the controller 190, or may store processed image, audio, or data signals.

For example, the storage unit 130 may store applications designed for executing various operations which may be processed by the controller 190; and in response to a request from the controller 190, the storage unit 130 may selectively provide some of the stored applications.

The programs and the like stored in the storage unit 130 are not particularly limited, as long as the programs may be executed by the controller 190.

While FIG. 2 illustrates an example in which the storage unit 130 is provided separately from the controller 190, but the scope of the present disclosure is not limited thereto, and at least a portion of the storage unit 130 may be included in the controller 190.

The storage unit 130 may include at least one of a volatile memory (e.g., DRAM, SRAM, SDRAM, etc.), a non-volatile memory (e.g., Flash memory), Hard disk drive (HDD), and Solid-state drive (SSD).

The storage unit 130 may store data pre-trained by machine learning, such as deep learning, etc., models, algorithms, and the like. For example, the storage unit 130 may store data about results of pre-training images, stored in a database, by machine learning.

Machine learning refers to a technique which provides computer systems the ability to learn with data and solve problems for themselves without being instructed by logic.

Deep learning refers to an artificial intelligence technique based on Artificial Neural Networks (ANN), which enables computer systems to think and learn for themselves like humans do. The ANN may be implemented in a software form, or in a hardware form such as a chip and the like.

For example, the ANN may include various types of algorithms, such as Deep Neural Network (DNN), Convolutional Neural Network (CNN), Recurrent Neural Network (RNN), Deep Belief Network (DBN), and the like.

The storage unit 130 may store an artificial intelligence algorithm based on deep learning, which is pre-trained by machine learning and used for processing images.

The sensor unit 140 may measure a physical quantity or detect an operating state of the image displaying apparatus 100, and may convert the measured or detected information into an electrical signal.

The sensor unit 140 may include a proximity sensor, a temperature/humidity sensor, an illumination sensor, and the like.

The image acquirer 145 may acquire a surrounding image of the image displaying apparatus 100. For example, the image acquirer 145 may include at least one camera (e.g., camera 500 of FIG. 1B).

The at least one camera, included in the image acquirer 145, may be a digital camera. The digital camera may include at least one optical lens, an image sensor (e.g., a CMOS image sensor) including a plurality of photodiodes (e.g., pixels) on which an image is formed by light transmitted through the optical lens, and a digital signal processor (DSP) to construct an image based on signals output from the photodiodes. The DSP may produce not only a still image, but also a video including frames of still images.

The images, acquired by the image acquirer 145, may be stored in the storage unit 130. The images acquired by the image acquirer 145 may be transmitted to the controller 190.

The input unit 150 may include an input device (e.g., key, touch panel, etc.) for receiving a user input. The input unit 150 may include the input device of the remote controller 400.

The input unit 150 may receive a user input through the input device, or may transmit a command, corresponding to the received user input, to the controller 190.

The display 160 may convert the image signal, data signal, OSD signal, and control signal, which are processed by the controller 190, or the image signal, data signal, and control signal, etc., which are received from the external device interface 120, to generate driving signals.

The display 160 may include a display panel (not shown) including a plurality of pixels.

The plurality of pixels, included in the display panel, may include RGB sub-pixels. Alternatively, the plurality of pixels, included in the display panel, may include RGBW sub-pixels. By converting the image signal, data signal, OSD signal, control signal, and the like which are processed by the controller 190, the display 160 may generate driving signals for the plurality of pixels.

The display 160 may be a Plasma Display Panel (PDP), a Liquid Crystal Display (LCD), an Organic Light Emitting Diode (OLED), a flexible display, etc., and may also be a three-dimensional (3D) display. The 3D display may be divided into an auto-stereoscopic scheme (glassless scheme) and a stereoscopic scheme (glass scheme).

The display 160 may be formed as a touch screen to be used as an input device as well as an output device.

The audio output unit 170 may include an audio device such as a speaker, a buzzer, etc., and may receive input of an audio signal processed by the controller 190 and output the received audio signal as voice. Further, the audio signal processed by the controller 19 may be input to an external audio device through the external device interface 120.

The power supply unit 180 may supply power throughout the entire image displaying apparatus 100. Particularly, the power supply unit 180 may supply power to the controller 190, which may be implemented in the form of a System On Chip (SOC), the display 160, the audio output unit 170, and the like.

The power supply unit 180 may include a converter (not shown) for converting AC power into DC power, a DC/DC converter (not shown) for converting a DC power level, and the like.

The controller 190 may be connected to each of the components of the image displaying apparatus 100. The controller 190 may transmit and receive signals with each of the components of the image displaying apparatus 100, and may control the overall operation thereof.

The controller 190 may include at least one processor, and may control the overall operation of the image displaying apparatus 100 by using the processor. Here, the processor may be a general processor such as a central processing unit (CPU). Also, the processor may be a dedicated device such as an ASIC or other hardware-based device.

In the case where the controller 190 includes a plurality of processors, the processors may be integrated on one chip, or may be physically separated from each other.

The controller 190 may determine a brightness of the surroundings (hereinafter referred to as an ambient brightness) of the image displaying apparatus 100 by using the illumination sensor included in the sensor unit 140.

The controller 190 may process the image acquired by the image acquirer 145.

The controller 190 may identify at least one object, included in the image acquired by the image acquirer 145, and may determine a type of the object. For example, the controller 190 may determine whether an object corresponding to a user's face, an object corresponding to a background, an object corresponding to a thing, etc., are included in the image acquired by the image acquirer 145.

In this case, the controller 190 may identify at least one object, included in the image acquired by the image acquirer 145, by using the artificial intelligence algorithm based on deep learning, which is pre-trained by machine learning and stored in the storage unit 130, and used for processing the image.

In the case where at least one object, corresponding to a user's face, is included in the image acquired by the image acquirer 145, the controller 190 may determine whether the object, corresponding to the user's face, in the image is an object corresponding to a face of an authorized user.

For example, the storage unit 130 may store face data of an authorized user; and the controller 190 may compare the object, corresponding to the user's face, in the image with the face data of the authorized user, and may determine whether the object, corresponding to the user's face, in the image is the object corresponding to the face of the authorized user.

If an ambient brightness, detected by the illumination sensor, is less than a predetermined ambient brightness, and/or if a screen brightness of the display 160 is less than a predetermined screen brightness, the controller 190 may control a screen brightness level of the display 160 to be increased according to a predetermined condition. Here, the unit of illumination is lux, and the unit of screen brightness is candela, but other units may also be used for illumination or screen brightness. For example, lumen (lm) may be used as the unit of screen brightness.

In this case, the controller 190 may control the level of screen brightness of the display 160 to be increased in stages according to a predetermined condition.

The controller 190 may control turning on/off of the display 160.

According to an operating state of the image displaying apparatus 100, the controller 190 may control the on/off of the display 160. For example, if the image display apparatus 100 enters a sleep mode, which is a standby state, the controller 190 may control the display 160 to be turned off.

According to a user input received from the input unit 150, the controller 190 may control the on/off of the display 160. For example, while the display 160 is turned on and a screen is displayed, the controller 190 may check whether a user input is received through the input unit 150, and may control the on/off of the display 160 based on whether the user input is received or not.

In this case, according to a mode of the image displaying apparatus 100, which is related to the on/off of the display 160, the controller 190 may control the on/off of the display 160. The mode of the image displaying apparatus 100, which is related to the on/off of the display 160, may be set according to a user input.

If the mode of the image displaying apparatus 100 is set to a first mode, when a user input is not received through the input unit 150 within a predetermined period of time (hereinafter referred to as a turn-off time) according to a user's setting, the controller 190 may control the display 160 to be turned off.

In addition, if the mode of the image displaying apparatus 100 is set to a second mode, when a user input is not received through the input unit 150 within a predetermined first period of time, the controller 190 may acquire a first image through the image acquirer 145. Here, the predetermined first period of time may be shorter than the turn-off time.

If a user input is received through the input unit 150 within the first period of time, the controller 190 may control the display 160 to be turned on continuously.

The controller 190 may determine whether the first image acquired by the image acquirer 145 includes at least one object corresponding to a user's face. Here, the object corresponding to the user's face may refer to an object corresponding to a forward-looking face. For example, the forward-looking face may refer to a face including both eyes, a nose, a mouth, and both ears.

If at least one object, corresponding to the user's face, is included in the first image acquired by the image acquirer 145, the controller 190 may control the display 160 to be turned on continuously, and if the object corresponding to the user's face is not included in the first image, the controller 190 may control the display 160 to be turned off.

If the object corresponding to the user's face is not included in the first image, the controller 190 may output a message, indicating turning off of the display 160, through the display 160 and/or the audio output unit 170.

For example, the controller 190 may output a message, notifying a user that the display 160 will be turned off after a second period of time, through the display 160.

In this case, if a user input is received within the second period of time after the message is output, the controller 190 may control the display 160 to be turned on continuously, and if a user input is not received within the second period of time, the controller 190 may control the display 160 to be turned off. Here, a sum of the first period of time and the second period of time may be shorter than the turn-off time.

Further, when the display 160 is turned off, the controller 190 may acquire a second image through the image acquirer 145 for a third period of time, and may determine whether at least one object, corresponding to the user's face, is included in the second image.

If at least one object, corresponding to the user's face, is included in the second image acquired by the image acquirer 145, the controller 190 may control the display 160 to be turned on again, and if the object corresponding to the user's face is not included in the second image, the controller 190 may control the display 160 to be turned off continuously.

In addition, based on whether at least one object, corresponding to a face of an authorized user, is included in the second image acquired by the image acquirer 145, the controller 190 may control turning on/off of the display 160. For example, if the mode of the image displaying apparatus 100 is set to a third mode, the controller 190 may control the on/off of the display 160 based on whether an object, corresponding to a face of an authorized user, is included in the image.

If at least one object, corresponding to the user's face, is included in the first image acquired by the image acquirer 145, the controller 190 may determine whether the object is an object corresponding to the face of the authorized user.

If the object, corresponding to the user's face, in the first image is the object corresponding to the face of the authorized user, the display 160 may control the display 160 to be turned on continuously, and if the object included in the first image is not the object corresponding to the face of the authorized user, the controller 190 may control the display 160 to be turned off immediately.

Further, if at least one object, corresponding to the user's face, is included in the second image acquired by the image acquirer 145, the controller 190 may determine whether the object is an object corresponding to the face of the authorized user.

In this case, if the object, corresponding to the face of the authorized user, is included in the second image acquired by the image acquirer 145, the controller 190 may control the display 160 to be turned on again, and if the object, corresponding to the face of the authorized user, is not included in the second image, the controller 190 may control the display 160 to be turned off continuously.

In addition, if a user input is received after the message indicating turning off of the display 160 is output, the controller 190 may acquire an image through the image acquirer 145, and if an object, corresponding to the face of the authorized user, is included in the acquired image, the controller 190 may control the display 160 to be turned on continuously.

Moreover, if a user input is received after the display 160 is turned off, the controller 190 may acquire an image through the image acquirer 145, and if an object, corresponding to the face of the authorized user, is included in the acquired image, the controller 190 may control the display 160 to be turned on again.

A block diagram of the image displaying apparatus 100 illustrated in FIG. 2 is merely a block diagram for one embodiment of the present disclosure, and respective components of the image displaying apparatus 100 may be integrated, added or omitted according to specifications of the image displaying apparatus 100.

That is, two or more components can be integrated into one component or one component can be subdivided into two or more components as required. Further, the function executed by each component is exemplified to describe embodiments of the present disclosure and detailed operations or devices do not limit the scope of the present disclosure.

Figure 3:
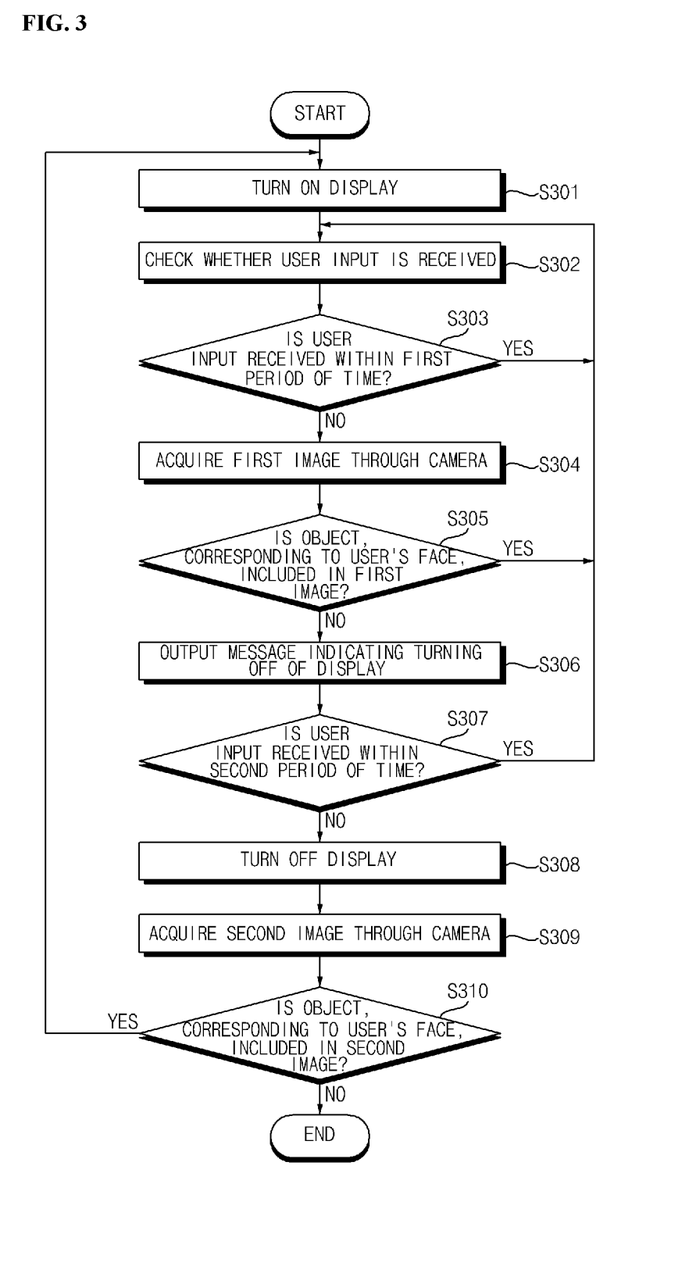
FIG. 3 is a flowchart illustrating a method of operating the image displaying apparatus according to an embodiment of the present disclosure.
Figure 4:
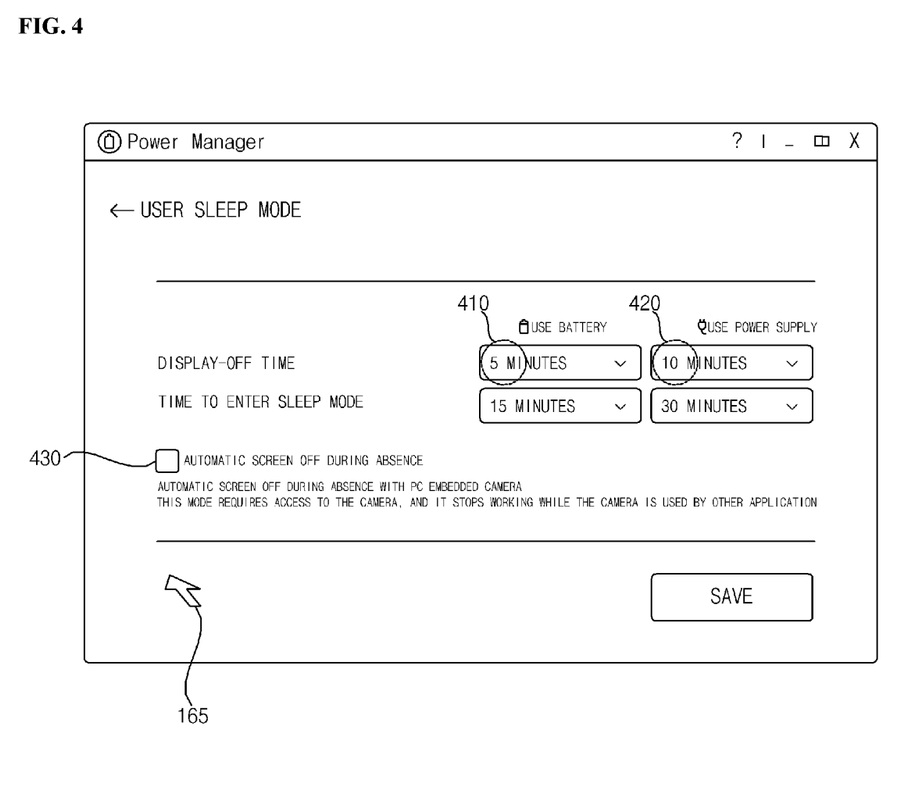
FIG. 4 is a diagram referred to in explaining an operation of the image displaying apparatus of FIG. 3.

FIG. 3 is a flowchart illustrating a method of operating the image displaying apparatus according to an embodiment of the present disclosure, and FIG. 4 is a diagram referred to in explaining an operation of the image displaying apparatus of FIG. 3.

Referring to FIG. 3, the image displaying apparatus 100 may turn on the display 160 to output a screen in S301.

While the display 160 is turned on and the screen is displayed, the image displaying apparatus 100 may check whether a user input is received through the input unit 150 in S302.

FIG. 4 shows a screen for setting a mode of the image displaying apparatus 100, which is related to the on/off of the display 160.

The image displaying apparatus 100 may provide a first mode of controlling the on/off of the display 160 according to a set turn-off time.

A user may set a turn-off time in the case where the image displaying apparatus 100 uses power stored in a battery and in the case where the image displaying apparatus 100 uses power supplied from an external source.

As illustrated in FIG. 4, a turn-off time 410 in the case where the image displaying apparatus 100 uses power stored in the battery may be set differently from a turn-off time 420 in the case where the image displaying apparatus 100 uses power supplied from an external source.

When the mode of the image displaying apparatus 100 is set to the first mode, if a user input is not received within the turn-off time set by the user, the image displaying apparatus 100 may turn off the display 160.

In addition, the image displaying apparatus 100 may provide a second mode of controlling the on/off of the display 160 by determining whether a user is absent through the image acquirer 145.

As illustrated in FIG. 4, when a user selects an indicator 430 for setting the second mode by using a pointer 165 displayed on the screen, the image displaying apparatus 100 may control the on/off of the display 160 according to the second mode. The following description will be given of an operation performed by the image displaying apparatus 100 set in the second mode.

Referring back to FIG. 3, the image displaying apparatus 100 may determine whether a user input is received through the input unit 150 within a predetermined first period of time (e.g., 1 minute) in S303.

If the user input is received within the first period of time, the image displaying apparatus 100 may control the display 160 to be turned on continuously, and then the procedure returns to operation S302, where the image displaying apparatus 100 may continue to determine whether the user input is received through the input unit 150.

Further, if the user input is not received through the input unit 150 within the predetermined first period of time, the image displaying apparatus 100 may acquire a first image through the image acquirer 145 in S304.

In this case, if an ambient brightness of the image displaying apparatus 100, which is detected by the illumination sensor, is less than a predetermined ambient brightness, and/or if a screen brightness of the display 160 is less than a predetermined screen brightness, the image displaying apparatus 100 may control a screen brightness level of the display 160 to be increased according to a predetermined condition. Further, if the screen brightness level of the display 160 is increased according to the predetermined condition, the image displaying apparatus 100 may acquire the first image through the image acquirer 145.

Moreover, the image displaying apparatus 100 may control a screen brightness level of the display 160 to be increased in stages according to a predetermined condition, and may acquire the first image through the image acquirer 145 every time the screen brightness level of the display 160 is increased in stages.

The image displaying apparatus 100 may determine whether at least one object, corresponding to a user's face, is included in the first image acquired by the image acquirer 145 in S305.

If at least one object, corresponding to the user's face, is included in the first image, the image displaying apparatus 100 may control the display 160 to be turned on continuously, and then the procedure returns to operation S302, where the image displaying apparatus 100 may continue to determine whether the user input is received through the input unit 150.

If the object, corresponding to the user's face, is not included in the first image acquired by the image acquirer 145, the image displaying apparatus 100 may output a message, indicating turning off of the display 160, through the display 160 and/or the audio output unit 170 in S306.

The image displaying apparatus 100 may determine whether the user input is received within a second period of time (e.g., 10 seconds) after outputting the message indicating turning off of the display 160 in S307.

If the user input is received within the second period of time, the image displaying apparatus 100 may control the display 160 to be turned on continuously, and then the procedure returns to S302, where the image displaying apparatus 100 may continue to determine whether the user input is received through the input unit 150.

By contrast, if the user input is not received within the second period of time, the image displaying apparatus 100 may control the display 160 to be turned off in S308.

The image displaying apparatus 100 may acquire a second image through the image acquirer 145 for a third period of time after turning off the display 160 in S309.

In this case, if an ambient brightness of the image displaying apparatus 100, which is detected by the illumination sensor, is less than a predetermined ambient brightness, the image displaying apparatus 100 may control a screen brightness level of the display 160 to be increased according to a predetermined condition. Further, if the screen brightness level of the display 160 is increased according to the predetermined condition, the image displaying apparatus 100 may acquire the second image through the image acquirer 145. In this case, a screen output on the display 160 may be a predetermined screen to protect a user's privacy.

Further, the image displaying apparatus 100 may control the screen brightness level of the display 160 to be increased in stages according to a predetermined condition, and may acquire a second image through the image acquirer 145 every time the screen brightness level of the display 160 is increased in stages.

The image displaying apparatus 100 may determine whether at least one object, corresponding to the user's face, is included in the second image acquired by the image acquirer 145 in S310.

If at least one object, corresponding to the user's face, is included in the second image, the procedure returns to operation S301, where the image displaying apparatus 100 may control the display 160 to be turned on again.

By contrast, if the object, corresponding to the user's face, is not included in the second image acquired by the image acquirer 145 for the third period of time, the image displaying apparatus 100 may control the display 160 to be turned off continuously.

Figure 5:
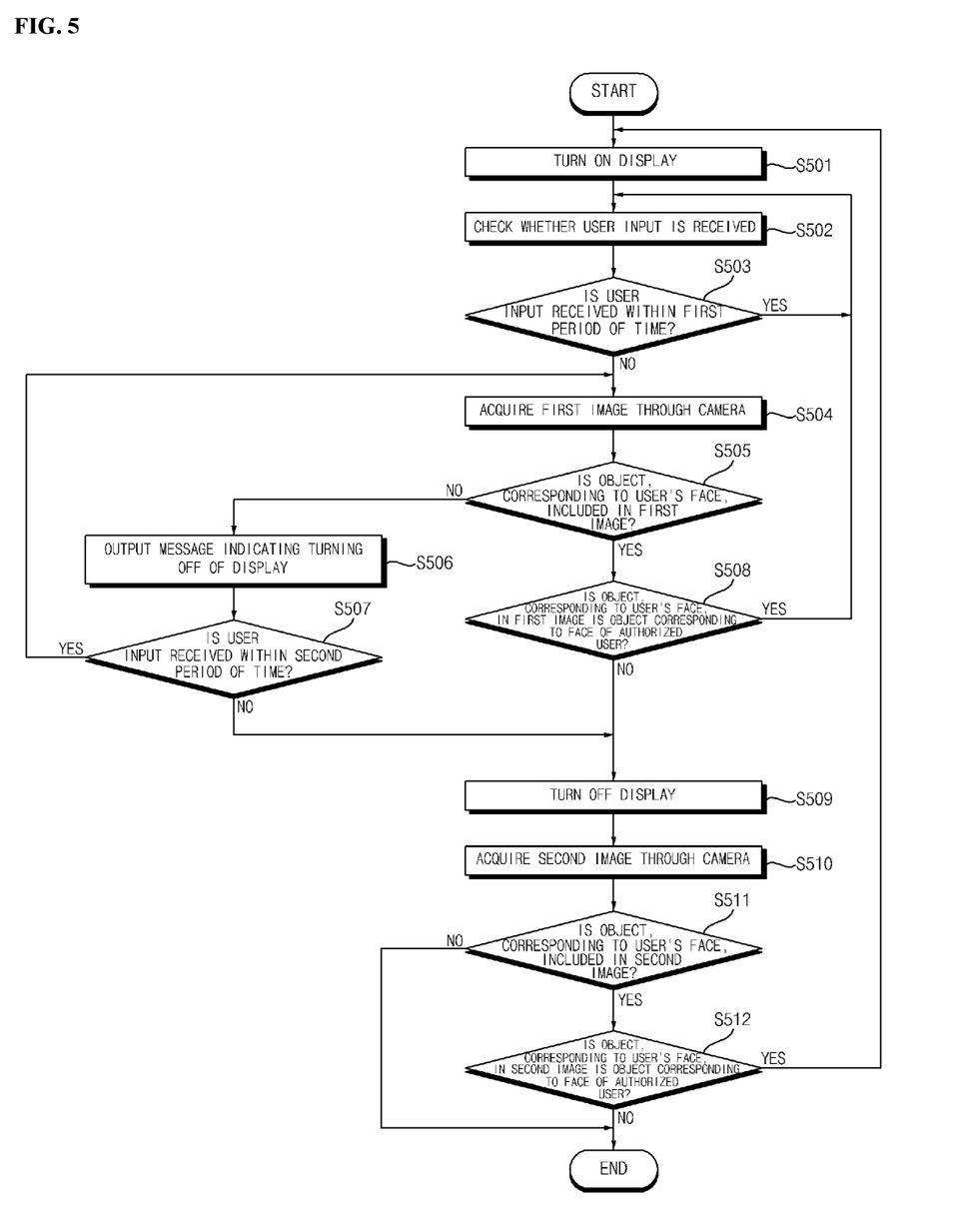
FIG. 5 is a flowchart illustrating a method of operating an image displaying apparatus according to another embodiment of the present disclosure.
Figure 6:
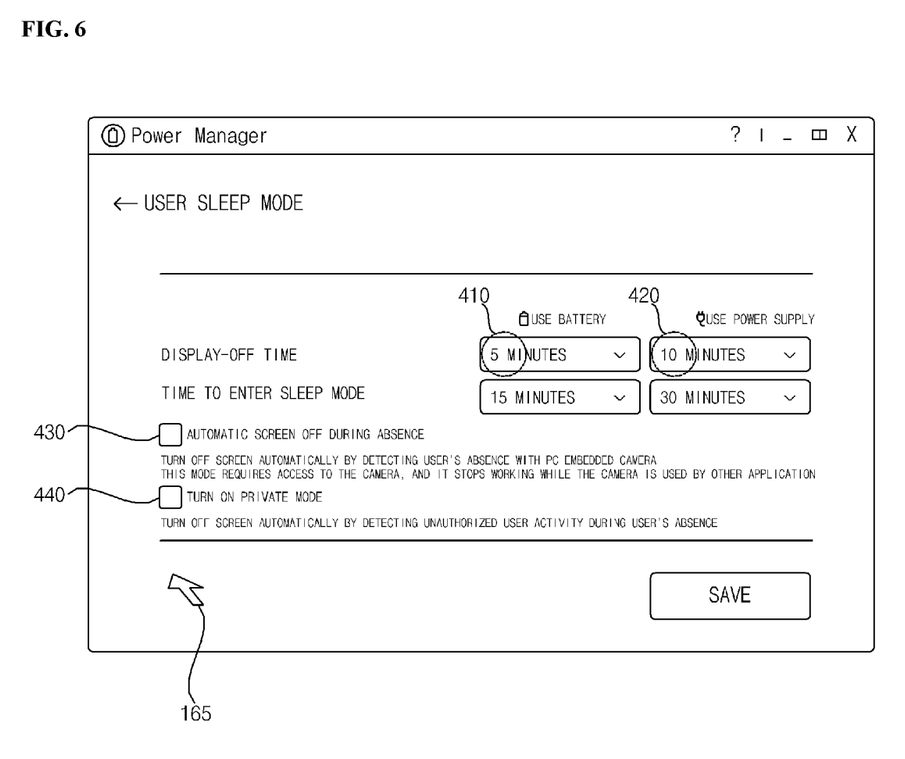
FIG. 6 is a diagram referred to in explaining an operation of the image displaying apparatus of FIG. 5.

FIG. 5 is a flowchart illustrating a method of operating an image displaying apparatus according to another embodiment of the present disclosure, and FIG. 6 is a diagram referred to in explaining an operation of the image displaying apparatus of FIG. 5. Detailed descriptions overlapping with those of FIGS. 3 and 4 will be omitted.

Referring to FIG. 5, the image displaying apparatus 100 may turn on the display 160 to output a screen in S501.

While the display 160 is turned on and the screen is displayed, the image displaying apparatus 100 may check whether a user input is received through the input unit 150 in S502. FIG. 6 shows a screen for setting a mode of the image displaying apparatus 100, which is related to the on/off of the display 160.

The image displaying apparatus 100 may provide a first mode of controlling the on/off of the display 160 according to a turn-off time 410 and 420 set by a user.

When the mode of the image displaying apparatus 100 is set to the first mode, if a user input is not received within the turn-off time 410 and 420 set by the user, the image displaying apparatus 100 may turn off the display 160.

In addition, the image displaying apparatus 100 may provide a second mode of controlling the on/off of the display 160 by determining absence of the user through the image acquirer 145.

In this case, when the user selects an indicator 430 for setting the second mode by using a pointer 165 displayed on the screen, an indicator 440 may be activated for setting a third mode of protecting the user's privacy, in which the image displaying apparatus 100 may control the on/off of the display 160 by determining whether the user is an authorized user.

When the user selects the indicator 440 for setting the third mode by using the pointer 165 displayed on the screen, the image displaying apparatus 100 may control the on/off of the display 160 according to the third mode. The following description will be given of an operation performed by the image displaying apparatus 100 set in the third mode.

Referring back to FIG. 5, the image displaying apparatus 100 may determine whether a user input is received through the input unit 150 within a predetermined first period of time (e.g., 1 minute) in S503.

If the user input is received within the first period of time, the image displaying apparatus 100 may control the display 160 to be turned on continuously, and then the procedure returns to operation S502, where the image displaying apparatus 100 may continue to determine whether the user input is received through the input unit 150.

By contrast, if the user input is not received through the input unit 150 within the predetermined first period of time, the image displaying apparatus 100 may acquire a first image through the image acquirer 145 in S504.

The image displaying apparatus 100 may determine whether at least one object, corresponding to a user's face, is included in the first image acquired by the image acquirer 145 in S505.

If the object, corresponding to the user's face, is not included in the first image acquired by the image acquirer 145, the image displaying apparatus 100 may output a message, indicating turning off of the display 160, through the display 160 and/or the audio output unit 170 in S506.

The image displaying apparatus 100 may determine whether the user input is received within a second period of time (e.g., 10 seconds) after outputting the message indicating turning off of the display 160 in S507.

If the user input is received within the second period of time, the procedure returns to operation S504, where the image displaying apparatus 100 may acquire the first image again through the image acquirer 145, and may determine again whether at least one object, corresponding to the user's face, is included in the first image.

If the user input is not received within the second period of time, the image displaying apparatus 100 may control the display 160 to be turned off in S509.

In addition, if at least one object, corresponding to the user's face, is included in the first image, the image displaying apparatus 100 may determine whether the object, corresponding to the user's face, in the first image is an object corresponding to a face of an authorized user in S508.

If the object, corresponding to the user's face, in the first image is the object corresponding to the face of the authorized user, the image displaying apparatus 100 may control the display 160 to be turned on continuously and may continue to determine whether the user input is received through the input unit 150.

By contrast, if the object, corresponding to the user's face, in the first image is not the object corresponding to the face of the authorized user, the image displaying apparatus 100 may control the display 160 to be turned off immediately.

The image displaying apparatus 100 may acquire a second image through the image acquirer 145 for a third period of time after turning off the display 160 in S510.

The image displaying apparatus 100 may determine whether at least one object, corresponding to the user's face, is included in the second image acquired by the image acquirer 145 in S511.

If at least one object, corresponding to the user's face, is included in the second image, the image displaying apparatus 100 may determine whether the object, corresponding to the user's face, in the second image is an object corresponding to the face of the authorized user in S512.

If the object, corresponding to the user's face, in the second image is the object corresponding to the face of the authorized user, the procedure returns to operation S501, where the image displaying apparatus 100 may control the display 160 to be turned on again.

By contrast, if the object, corresponding to the user's face, is not included in the second image acquired by the image acquirer 145 for the third period of time, or if the object, corresponding to the user's face, in the second image is not the object corresponding to the face of the authorized user, the image displaying apparatus 100 may control the display 160 to be turned off continuously.

Figure 7:
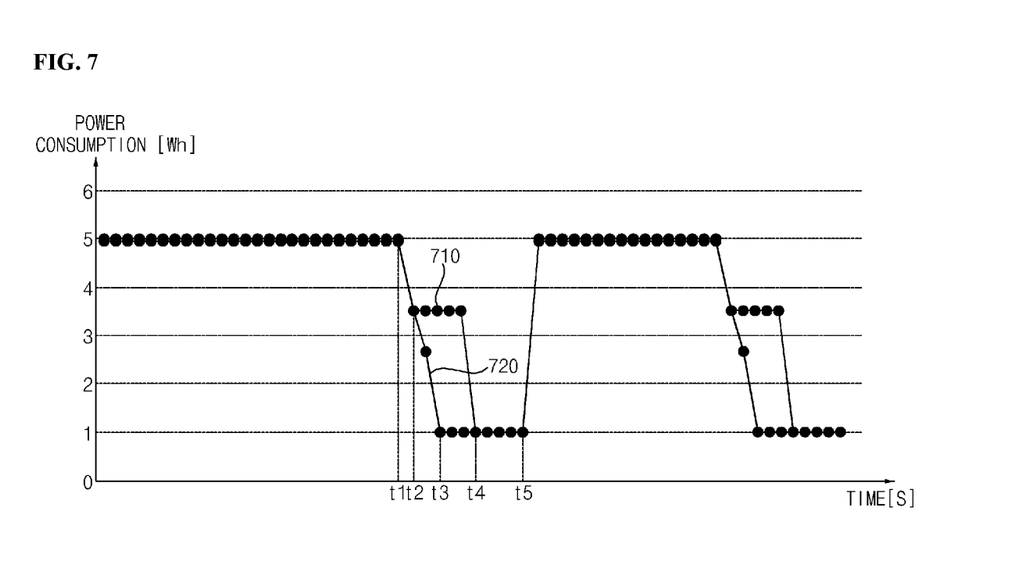
FIG. 7 is a diagram referred to in explaining power consumption during operation of an image displaying apparatus according to various embodiments of the present disclosure.

FIG. 7 is a diagram referred to in explaining power consumption during operation of an image displaying apparatus according to various embodiments of the present disclosure.

More specifically, FIG. 7 illustrates a graph of power consumption of the image displaying apparatus 100 in the case where a user input is received through the input unit 150 until t1, the user input is not received from t1 to t5, and then the user input is received again after t5.

Here, a first graph 710 shows power consumption in the case where the on/off of the display 160 is controlled according to a preset turn-off time; and a second graph 720 shows power consumption in the case where the on/off of the display 160 is controlled by determining the absence of a user through the image acquirer 145.

Referring to FIG. 7, the first graph 710 shows that if a user input is not received after t1, the display 160 is maintained in an on state from t1 to t4, which is a turn-off time preset by a user, and then the display 160 is turned off at t4 and is maintained in an off state until t5.

By contrast, the second graph 710 shows that if a user input is not received after t1, it is determined whether an object, corresponding to a user's face, is included in the first image acquired by the image acquirer 145. In this case, if the object, corresponding to the user's face, is not included in the first image, the display 160 is turned off at t3, which is a time before a preset turn-off time elapses, and the display 160 is maintained in an off state until t5.

According to various embodiments of the present disclosure as described above, it may be determined accurately whether the image displaying apparatus 100 is used by a user based on images acquired by a camera of the image acquirer 145 along with a user input, and the on/off of the display 160 may be controlled accurately according to a user's intention, thereby improving convenience of the user of the image displaying apparatus 100; and compared to a case where the on/off of the display 160 is controlled based on only a user input, unnecessary power consumption of the image displaying apparatus 100 may be reduced.

In addition, the on/off of the display 160 may be controlled by determining whether the image displaying apparatus 100 is used by an authorized user based on the images acquired by the camera of the image acquirer 145, thereby protecting privacy of the user of the image displaying apparatus 100.

Since the accompanying drawings are merely for easily understanding embodiments disclosed herein, it should be understood that the technical spirit disclosed herein is not limited by the accompanying drawings, and all changes, equivalents or substitutions are included in the spirit and technical scope of the present disclosure.

Likewise, although operations are shown in a specific order in the drawings, it should not be understood that the operations are performed in the specific order shown in the drawings or in a sequential order so as to obtain desirable results, or all operations shown in the drawings are performed. In certain cases, multitasking and parallel processing may be advantageous.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

What is claimed is:

1. An image displaying apparatus, comprising:
an input unit;
a camera;
a display;
a sensor configured to detect an ambient brightness of the image displaying apparatus; and
a controller configured to:
check whether a user input is received through the input unit when the display is turned on and a screen is displayed through the display;
acquire a first image through the camera when no user input is received within a predetermined first period of time;
based on a face of any user being included in the acquired first image, determine whether the face included in the acquired first image corresponds to an authorized user;
based on the face included in the first image corresponding to the authorized user, control the display to remain turned on;
based on the face included in the first image not corresponding to the authorized user, control the display to be turned off immediately;
based on the acquired first image not including the face of any user, control the display to be turned off according to a predetermined condition related to the user input;
based on the ambient brightness being greater than or equal to a predetermined ambient brightness after the display is turned off, acquire a second image through the camera in a state in which the display is turned off;
based on the ambient brightness being less than the predetermined ambient brightness after the display is turned off, control the display to display a predetermined screen corresponding to protecting a user's privacy and acquire the second image through the camera; and
control the display to be turned on when the second image including the face corresponding to the authorized user is acquired within a predetermined third period of time after the display is turned off.

2. The image displaying apparatus of claim 1, wherein the controller is further configured to:
output a message, via the display, indicating turning off of the display when the acquired first image does not include the face of any user;
control the display to remain turned on based on a user input received within a second period of time after outputting the message; and
control the display to be turned off based on no user input being received within the second period of time.

3. The image displaying apparatus of claim 1,
wherein the controller is further configured to:
control a screen brightness level of the display to be increased according to a predetermined condition related to the ambient brightness based on the ambient brightness being less than the predetermined ambient brightness and a screen brightness of the display being less than a predetermined screen brightness, wherein the first image is acquired through the camera based on the screen brightness level of the display being increased according to the predetermined condition related to the ambient brightness.

4. The image displaying apparatus of claim 3, wherein the controller is further configured to:
control the screen brightness level of the display to be increased in stages according to the predetermined condition related to the ambient brightness; and
acquire the first image through the camera and determine whether the first image includes the face of any user every time the screen brightness level of the display is increased in stages according to the predetermined condition related to the ambient brightness.

5. A method of operating an image displaying apparatus, the method comprising:
checking whether a user input is received when a display of the image displaying apparatus is turned on and a screen is displayed through the display;

acquiring a first image through a camera of the image displaying apparatus when no user input is received within a predetermined first period of time;

based on a face of any user being included in the acquired first image, determining whether the face included in the acquired first image corresponds to an authorized user;

based on the face included in the first image corresponding to the authorized user, controlling the display to remain turned on;

based on the face included in the first image not corresponding to the authorized user, controlling the display to be turned off immediately;

based on the acquired first image not including the face of any user, controlling the display to be turned off according to a predetermined condition related to the user input;

when an ambient brightness of the image displaying apparatus is higher than or equal to a predetermined ambient brightness after the display is turned off, acquiring a second image through the camera in a state in which the display is turned off;

when the ambient brightness is less than the predetermined ambient brightness after the display is turned off, displaying a predetermined screen corresponding to protecting a user's privacy through the display and acquiring the second image through the camera; and controlling the display to be turned on when the second image including the face corresponding to the authorized user is acquired within a predetermined third period of time after the display is turned off.

6. The method of claim 5, further comprising:

outputting a message indicating turning off of the display when the acquired first image does not include the face of any user;

controlling the display to remain turned on based on a user input received within a second period of time after outputting the message; and controlling the display to be turned off based on no user input being received within the second period of time.

7. The method of claim 5, further comprising:

controlling a screen brightness level of the display to be increased according to a predetermined condition related to the ambient brightness based on the ambient brightness being less than the predetermined ambient brightness and a screen brightness of the display being less than a predetermined screen brightness, wherein the first image is acquired through the camera based on the screen brightness level of the display being increased according to the predetermined condition related to the ambient brightness.

8. The method of claim 7, further comprising:

controlling the screen brightness level of the display to be increased in stages according to the predetermined condition related to the ambient brightness; and acquiring the first image through the camera and determining whether the first image includes the face of any user every time the screen brightness level of the display is increased in stages according to the predetermined condition related to the ambient brightness.

* * * * *